United States Patent
Wu et al.

(10) Patent No.: US 12,051,243 B2
(45) Date of Patent: Jul. 30, 2024

(54) TRANSFORMERS FOR REAL WORLD VIDEO QUESTION ANSWERING

(71) Applicant: International Business Machines Corporation, Armonk, NY (US)

(72) Inventors: Bo Wu, Cambridge, MA (US); Chuang Gan, Cambridge, MA (US); Zhenfang Chen, Cambridge, MA (US); Dakuo Wang, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 17/516,119

(22) Filed: Nov. 1, 2021

(65) Prior Publication Data

US 2023/0136515 A1    May 4, 2023

(51) Int. Cl.
| | |
|---|---|
| *G06F 40/284* | (2020.01) |
| *G06F 18/21* | (2023.01) |
| *G06F 40/205* | (2020.01) |
| *G06N 3/044* | (2023.01) |
| *G06N 3/045* | (2023.01) |
| *G06V 20/40* | (2022.01) |

(52) U.S. Cl.
CPC .............. *G06V 20/41* (2022.01); *G06F 18/21* (2023.01); *G06F 40/205* (2020.01); *G06F 40/284* (2020.01); *G06N 3/044* (2023.01); *G06N 3/045* (2023.01); *G06V 20/46* (2022.01)

(58) Field of Classification Search
CPC ...... G06V 20/41; G06V 20/46; G06F 40/284; G06F 40/205
See application file for complete search history.

(56) References Cited

U.S. PATENT DOCUMENTS

| | | |
|---|---|---|
| 10,997,368 B2 | 5/2021 | Williams et al. |
| 11,003,855 B2 | 5/2021 | Grube |
| 11,100,324 B2 | 8/2021 | Williams et al. |

(Continued)

FOREIGN PATENT DOCUMENTS

WO    2021/160686 A1    8/2021

OTHER PUBLICATIONS

Yunfei Chu et al., "Social-Guided Representation Learning for Images via Deep Heterogeneous Hypergraph Embedding," 2018 IEEE International Conference on Multimedia and Expo (ICME), pp. 1-6, Jul. 7, 2018 (Chu et al). (Year: 2018).*

(Continued)

*Primary Examiner* — Myron Wyche
(74) *Attorney, Agent, or Firm* — Scully, Scott, Murphy & Presser, P.C.; Daniel P. Morris

(57) ABSTRACT

A processor may receive a video including a plurality of video frames in sequence and a question regarding the video. For a video frame in the plurality of video frames, a processor may parse the video frame into objects and relationships between the objects, and create a subgraph of nodes representing objects and edges representing the relationships, where parsing and creating are performed for each video frame in the plurality of video frames, where a plurality of subgraphs can be created. A processor may create a hypergraph connecting subgraphs by learning relationships between the nodes of the subgraphs, where a hyper-edge is created to represent a relationship between at least one node of one subgraph and at least one node of another subgraph in the plurality of subgraphs. A processor may generate an answer to the question based on the hypergraph.

20 Claims, 10 Drawing Sheets

(56) References Cited

U.S. PATENT DOCUMENTS

| | | | |
|---|---|---|---|
| 2014/0324864 A1* | 10/2014 | Choe .................... | G06F 16/73 |
| | | | 707/737 |
| 2021/0149901 A1* | 5/2021 | Fonseca de Lima ........................ | |
| | | | G06F 16/24522 |
| 2021/0249139 A1* | 8/2021 | Thakore ................ | G16H 40/20 |
| 2022/0114369 A1* | 4/2022 | Debnath ................. | G06T 7/20 |

OTHER PUBLICATIONS

Gan, Z., "Visual Question Answering and Visual Reasoning", Microsoft, Jun. 15, 2020, 62 pages.

Yu, W., et al., "A Technical Question Answering System with Transfer Learning", Proceedings of the 2020 EMNLP (Systems Demonstrations), Nov. 16-20, 2020, pp. 92-99.

Disclosed Anonymously, "Method and System for Optimal Content Preview in Real-Time Textual Communicator", An IP.com Prior Art Database Technical Disclosure, IP.com No. IPCOM000259300D, Jul. 26, 2019, 4 pages.

Disclosed Anonymously, "Authenticating a Real-World Application Using Mixed Reality", An IP.com Prior Art Database Technical Disclosure, IP.com No. IPCOM000257673D, Mar. 1, 2019, 4 pages.

Disclosed Anonymously, "Multi-Factor Authentication Using Real-World Object Composition and Analysis", An IP.com Prior Art Database Technical Disclosure, IP.com No. IPCOM000238653D, Sep. 9, 2014, 6 pages.

Horev, R., "BERT Explained: State of the art language model for NLP", https://towardsdatascience.com/bert-explained-state-of-the-art-language-model-for-nlp-f8b21a9b6270, Nov. 10, 2018, 8 pages.

NIST, "NIST Cloud Computing Program", http://csrc.nist.gov/groups/SNS/cloud-computing/index.html, Created Dec. 1, 2016, Updated Oct. 6, 2017, 9 pages.

* cited by examiner

| INPUT TOKEN SEQUENCE | | SITUATION 1 | | | | | | | | | SITUATION 2 | | | | | | | SITUATION N | |
|---|---|---|---|---|---|---|---|---|---|---|---|---|---|---|---|---|---|---|---|
| | ACT_EMB | ACT_EMB | [SEP] | PER_EMB | REL_EMB | OBJ_EMB | [SEP] | PER_EMB | REL_EMB | OBJ_EMB | [SEP] | ACT_EMB | ACT_EMB | [SEP] | PER_EMB | REL_EMB | OBJ_EMB | [SEP]... | [END] |
| TOKEN EMB (VECTOR) | A | A | M | P | R | O | M | P | R | O | M | A | A | M | P | R | O | M ... | M |
| TYPE EMB (DISCRETE) | 0 | 0 | MAX | 1 | 1 | 1 | MAX | 2 | 2 | 2 | MAX | 0 | 0 | MAX | 1 | 1 | 1 | MAX ... | MAX |
| SEGMENT (INT) | 1 | 1 | 0 | 0 | 0 | 0 | 0 | 0 | 0 | 0 | 0 | 1 | 1 | 0 | 0 | 0 | 0 | 0 ... | END |
| HYPER-EDGE EMB (INT) | 1 | 1 | 1 | 1 | 1 | 1 | 1 | 1 | 1 | 1 | 2 | 2 | 2 | 2 | 2 | 2 | 2 | 2 ... | N |
| SITUATION EMB (INT) | | | | | | | | | | | | | | | | | | | |

FIG. 4

TRANSFORMERS FOR REAL WORLD VIDEO QUESTION ANSWERING

BACKGROUND

The present application relates generally to computers and computer applications, and more particularly to machine learning, online chatting, human-robot communications, robotics comprehension, and autonomous visual reasoning, visual question answering by machines.

Humans may know about how to act in situations quickly and make feasible decisions subconsciously. Such ability may be logic-centered but not isolated or divorced from the surrounding situations since cognition in the real world usually is not separated from the context. Such situated reasoning is not easy to current state-of-the-art methods. Abilities for machines to learn and reason from real-world situations can help machines to perform automated actions intelligently.

BRIEF SUMMARY

The summary of the disclosure is given to aid understanding of a computer system and method of visual question answering, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

A computer-implemented method, in an aspect, can include receiving a video including a plurality of video frames in sequence. The method can also include receiving a question regarding the video. The method can also include, for a video frame in the plurality of video frames, parsing the video frame into at least objects and relationships between the objects, and creating a subgraph of nodes and edges, where the nodes represent the objects and the edges represent the relationships. Parsing and creating can be performed for each video frame in the plurality of video frames, where a plurality of subgraphs can be created. The method can also include creating a hypergraph connecting at least some of the subgraphs by learning relationships between the nodes of the subgraphs, where a hyper-edge is created to represent a relationship between at least one node of one subgraph and at least one node of another subgraph in the plurality of subgraphs. The method can also include generating an answer to the question based on the hypergraph.

A system, in an aspect, can include a processor and a memory device coupled with the processor. The processor can be configured to receive a video including a plurality of video frames in sequence. The processor can also be configured to receive a question regarding the video. The processor can also be configured to, for a video frame in the plurality of video frames, parse the video frame into at least objects and relationships between the objects, and create a subgraph of nodes representing objects and edges representing the relationships. The processor can be configured to perform parsing and creating for each video frame in the plurality of video frames, where a plurality of subgraphs can be created. The processor can also be configured to create a hypergraph connecting at least some of the subgraphs by learning relationships between the nodes of the subgraphs, where a hyper-edge is created to represent a relationship between at least one node of one subgraph and at least one node of another subgraph in the plurality of subgraphs. The processor can also be configured to generate an answer to the question based on the hypergraph.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 4 shows an example structure of hypergraph token sequence for representations in an embodiment.

DETAILED DESCRIPTION

Figure 1:
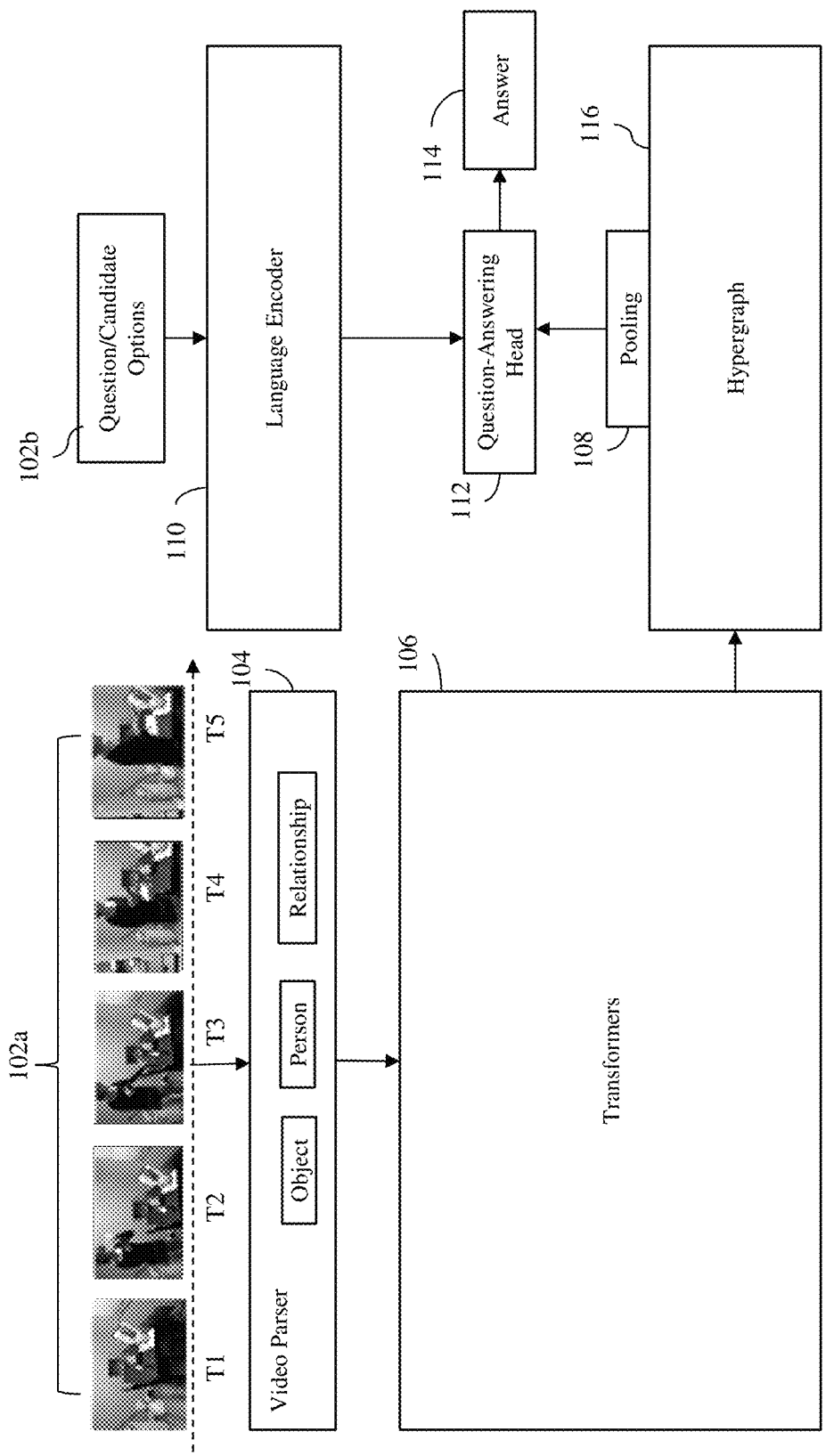
FIG. 1 is a diagram illustrating system architecture in an embodiment.

In one or more embodiments, systems, methods and techniques can be provided for allowing a machine to capture the present knowledge from surrounding scenes or situations and reason accordingly by way of machine learning. A machine, for example, can capture, for example, using a camera or like device, visual surrounding situations, which for example, can be manifested as a video or like visual data, and reason from it. In an embodiment, a machine such as a robot is trained to be able to reason from a given visual surrounding, for example, a given video, for instance, answer questions about the given visual surrounding or given video. For instance, a machine can be trained to understand situations dynamically and reason in the present situations according to its understanding. In this way, for example, a machine or a robot can autonomously learn to act on situations and/or effectively understand human actions in the real world. For instance, a machine or robot can learn to reason actions such as move or lift objects based on surrounding situations. Briefly, a situation describes entities, events, moments and environments. A situation can be provided by way of a video, which can include multiple consecutive and/or overlapped actions and interactions.

In an embodiment, a real-world situated reasoning can be provided via videos, in which a system or machine captures present knowledge from dynamic situations as structured representation and answers questions. The system or machine learns and reasons in dynamic real world situations to answer questions. In an embodiment, situations provided via a video can be represented by hierarchical graphs based on annotations. In an embodiment, situated reasoning can be performed over such graphs iteratively. For instance, in an embodiment, a given situation in real world videos can be represented by hyper-graphs connecting extracted atomic entities and relations (e.g., actions, persons, object, and relationships). In an embodiment, relationships in situations can include: person-object contracting relationships and spatial relationships, object-object spatial relationships, and/or action-action temporal relationships.

In an embodiment, a transformation-based question-answering architecture and/or system can be provided. Such architecture and/or system can recognize human, object and/or human-object relationships in the input video as a set of basic entities by a set of video parsers (e.g., object detector, relationship detector, human pose detector, action detector); perform bottom-up abstraction and reasoning over the abstract situation graphs from videos as contexts by a situation token sequence generator and a stacked situated action transformers deep network; represent the question/options together as an entire question-answering embedding by combining a language encoder for question and options; and predict the possible answers by a question answering head based on the question-answering embedding and pooled situation embedding. In an embodiment, types of questions can include interaction, sequence, prediction, and feasibility In an embodiment, visual abstraction and reasoning system, method, model and/or engine, which can be referred to also as, or can include, situated action transformers, disentangles visual perception, situation abstraction, and can provide question-answering capabilities. In an embodiment, a situation graph encoder connects the entities to structured situation representation (situation graphs). The system and/or method can convert the connected graphs to token sequence by hierarchical stacking. In an embodiment, a stacked situation graph transformer and/or a graph sequence decoder learn to predict masked (unseen) entity tokens in the input situation graphs and action tokens by simulating implicit status transition processes between the entities. A hypergraph generator may build output action hypergraphs by connecting both predicted actions, existing and predicted missing entities.

In an embodiment, architecture for situated action transformers for real world video question answering can include multiple layers of transformers, which can recognize basic entities and relations from video situations, perform bottom-up reasoning over the abstract situation graphs and predict possible answers. For example, a system or transformation-based question-answering architecture can recognize human, object or human-object relationships in input video as a set of basic entities by a set of video parsers (e.g., object detector, relationship detector, human pose detector, action detector). The system can perform bottom-up abstraction and reasoning over the abstract situation graphs from videos as contexts by a situation token sequence generator and a stacked deep networks (also referred to as situated action transformers (SAT)). In an embodiment, the system may represent the question and/or options together as an entire question-answering embedding by combining a language encoder for question and options. In an embodiment, the system may predict the possible answers by a question answering head based on the question-answering embedding and pooled situation embedding. The system can be applicable to online chatting, human-robot communications, and/or others.

In an embodiment, one or more processors may automatically or autonomously perform video question answering, for example, given a video scene (e.g., which can include one or more video frames) and a question, automatically or autonomously answer the question. For instance, a bot or a robot can have a model trained to answer a question regarding a video scene. In an embodiment, the model receives as input, a video including video frames and one or more questions, for example, from a user. Such videos can be scenes or visuals of surrounding environment from the real world, e.g., from a robot that is communicating with a user and capturing a surrounding visuals via its camera or like visual capture device. According to the video content (e.g., videos from the real world), the model can answer one or more questions or output an answer to one or more questions about the video. In an embodiment, a transformer including multiple layer architecture can learn to perform such video question answering. For example, humans and robots may interact communicatively. For instance, a user may communicate with a robot using a natural language, e.g., using a human spoken or written language, to say a sentence, phrase, word, and/or ask a question, in communicating with the robot. A robot may see the scene or surrounding situation via its camera or like device, see objects and actions, e.g., actions being performed, in the scene or surrounding situation. The model helps the robot to be able to understand the process of actions, the situation of the surrounding environment in the video, e.g., so that the robot may communicate with the user, for instance, answer questions such as but not limited to, what is one doing, will do, and/or already have done. The model can help the robot to intelligently assess the surrounding situation and answer questions and/or communicate with the user.

FIG. 1 is a diagram illustrating system architecture in an embodiment. The components shown include computer-implemented components, for instance, implemented and/or run on one or more hardware processors, or coupled with one or more hardware processors. One or more hardware processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors.

A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

In an embodiment, a system may include a video parser 104 or like component or functionality that can parse a given video 102a and extract objects and relationship. For example, the video parser 104 can receive a video 102a, which can include a plurality of video frames. The video 102a can include a time series of video frames or segments. The system also can include transformers 106 (also referred to as a transformers-based model or situated action transformers) that learn or build a hypergraph, a structure connecting objects and interactions between objects. For instance, the model 106 can convert visuals in the video 102a into a hypergraph. In an embodiment, a hypergraph includes connected subgraphs, where each subgraph represents a video frame. In an embodiment, an initial graph or situation graph associated with each video frame can be built based on the objects, persons, and/or relationships identified or extracted by the video parser 104. A graph associated with a video frame can be referred to as a subgraph. Initially the subgraphs can be separated, e.g., no connections between subgraphs. The transformers 106 may further learn more inherent connections between the nodes of the subgraphs, and also between the subgraphs, generating a hypergraph. In an embodiment, the transformers 106 may perform bottom-up abstraction and reasoning over the abstract situation graphs from videos as contexts by a situation token sequence generator and a stacked situated action transformers deep network. A situation graph, which can include node instances, subgraph edges and hypergraph edges, can be considered an abstraction of visual content of a video. One situation graph can include multiple subgraphs, where the subgraphs correspond to video frames. For instance, each subgraph corresponds to a video frame in the video. In an embodiment, a functionality (e.g., which can be referred to as a situation token sequence generator) may construct an initial situation graph by connected nodes and edges, but which do not have hyper-edges yet. A stacked situation action transformers deep network can be an action transition model, a deep neural network model with transformer architecture.

The system can also include a pooling component 108, which can be a neural network, that encodes the hypergraph into a vector, e.g., a fixed length visual embedding vector. For example, the pooling component 108 can be a neural network layer that transforms the hypergraph structure into a visual embedding vector. In an embodiment, this pooling layer may calculate the mean of inputs to transform the input hypergraph or hypergraphs to an embedding vector for a unified representation.

The system further can include a language encoder 110 that encodes the received question or utterance 102b into a vector or embedding vector, e.g., a linguistic embedding vector. The question or utterance 102b, for instance, by way of example, can be: "Which object is the person able to take after putting down the bottle?" In an embodiment, for example, optionally, candidate answers or options can also be provided as part of the input, e.g., to the language encoder 110, such as "Table", "Bottle", "Book", "Chair". In an embodiment, the language encoder 110 can represent the question and options (e.g., if candidate options are provided) together as an entire question-answering embedding by combining a language encoder for question and options.

The system can also include a question-answering component 112, e.g., referred to as a question-answering head, which takes the visual representation (e.g., visual embedding vector) from the pooling component 108, e.g., a neural network, and the language representation (e.g., linguistic embedding vector) from the language encoder 110, and outputs an answer 114 based on those representations. For example, the question-answering component 112 can predict one or more possible answers based on the question-answering embedding and pooled situation embedding.

In an embodiment, the architecture shown in FIG. 1 includes a neuro-symbolic framework. In an embodiment, neuro-symbolic reasoning can be employed, which can disentangle visual perception, perform situation abstraction, language understanding, and symbolic reasoning.

The video parser 104 can be a visual perception module, which can include a set of detectors, which can obtain human-centric and/or object-centric interactions from video keyframe inputs. In an embodiment, the video parser 104 can recognize human, object or human-object relationships in the input video as a set of basic entities using a set of video parsers (object detector, relationship detector, human pose detector, action detector, etc.). Given an input video or video segment, the video parser 104 can output situation data types. In an embodiment, the video parser 104 can use bounding box ground-truths from to localize the objects/humans in a video. In an embodiment, an object detector (e.g., Region Based Convolutional Neural Networks (R-CNN), Faster R-CNN, and/or others) can be used to detect objects. In an embodiment, techniques such as deep neural networks can be used to extracts visual representation for each object or person. Existing techniques such as vision and pattern recognition, natural language processing, and pose parser, can be used to detect relationship and extract relationship representation, and to extract skeleton representations for motions. In an embodiment, for tasks with query actions (e.g., feasibility or sequence) in questions, an existing pretrained action recognizer can be adopted to recognize seen actions in a video as preconditions. In an embodiment, the video parser 104 can be trained on the video keyframes from a training set to obtain features of appearance, recognition, bounding box positions. The video parser 104 perceives entities, relationships and human and/or object interactions for visual scenes or situations. In an embodiment, the present scene or situation is sent to the transformers 106 to learn situation abstraction and predict future situations in forms of hypergraphs (also referred to as situation hypergraphs).

Figure 2:
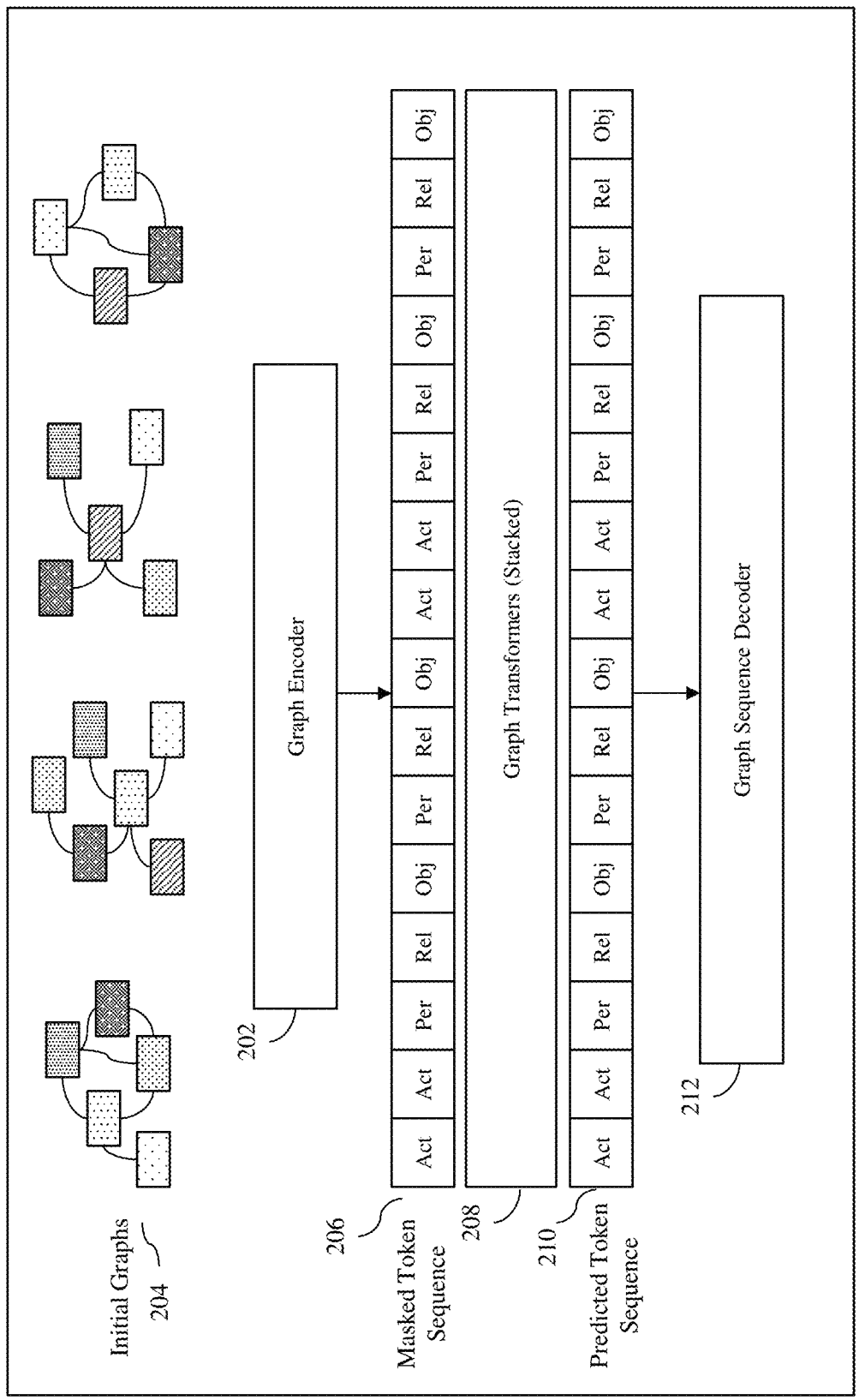
FIG. 2 is shows further details of transformers in an embodiment.

FIG. 2 is shows further details of transformers (also referred to as a transformers-based model) 106 in an embodiment. In an embodiment, the transformers can process and predict the present and future situations in the form of hypergraphs. In an embodiment, a graph encoder 202 performs dynamic state transitions over situation hypergraphs. A state transition is an attention updating process of a self-attention mechanism in an action transition model. For example, initially, the situation hypergraphs may not be complete or do not have complete parts such as hyperedges. The transformers generate and output complete hypergraphs. The graph encoder 202 constructs "initial" graphs by connecting detected entities or relationships and encodes graphs to a structured graph token sequence 206. In an embodiment, the graph encoder 202 connects the entities to structured situation representation (situation graphs) and converts the connected graphs to token sequence 206 by hierarchical stacking. For example, the graph encoder 202 follows the paradigm of self-supervision learning. The graph encoder 202 takes a token sequence as input and predicts the masked tokens in the sequence. In an embodiment, the sequence 206 describes the top-down structures of situation graphs and implies situation segments, subgraph segments, and entity tokens. Situation segments can be discrete segment tokens for situation marks in the sequence. Consider that given t situation segments $<s^0, \ldots, s^T>$, each situation segment in time t includes multiple predicate tokens and a set of triplet tokens. Each predicate denotes an appeared atomic action $a_j$ where there exists hyper-edges relation connecting a connected situation subgraph in the situation $s_t$. The triplet tokens $<h_i, o_i, r_i>$ represent human-relationship-object interactions. Action predicates can be compositions of an atomic action verb and an object noun (e.g., take the book, sit on the chair). In an embodiment, each situation segment can be padded with zero tokens for a fixed length. To indicate the graph entities, hyper-edges, segments, and situations, the graph encoder 202 may sum the multiple types of embedding vectors for each token: token embedding, type or hyperedge embedding, situation embedding, position embedding, and segment embedding.

Graph transformer 208 can dynamically predict action states or relationships by learning the relations among the input data types in given situations (e.g., objects in given video). In an embodiment, the model architecture includes multiple-layers of stacked transformers with down-stream task predictors. For stacked transformers, in an embodiment, the graph transformer 208 can use stacked transformer blocks to calculate self-attention scores for input token sequence with multiple heads. In an embodiment, the stacked transformers can include a Bidirectional Encoder Representations from Transformers (BERT) model. The attentions describe the "connections" of each potential relationship between two nodes in situation graphs or subgraphs (e.g., action hyper-edges or human-relationship-object triplets). In an embodiment, because the self-attention inner structures of transformers correspond with token pairs, the whole attention over input tokens performs a dynamic relation modeling. In an embodiment, the neighbored node connections are summed into a single node. The aggregated effect can be stored in the current state in time t and applied to the prediction for the missing information in the current step or the state of next time t+1. Such dynamic attention modeling can deal with all possible relations as implicit connections, and may provide robust modeling even when relationships are unknown or some of the visual clues are not reliable. In an embodiment, this model can also be adopted to predict several unseen situations for prediction questions or feasibility questions. The graph transformers, for example, generate predicted token sequence 210.

Graph sequence decoder 212 may perform following self-supervision tasks: action type prediction, human-object relationship type prediction, and masked token modeling (for objects or persons). For example, action type prediction and human-object relationship type prediction can use classifiers to predict action hyper-edges or relationships using multilayer perceptrons (MLPs), artificial neural networks, with pooled global representations of all states in corresponding situations. The masked token modeling can enhance the representation robustness by reconstructing their embedding vectors. The graph sequence decoder 212 output a hypergraph. In an embodiment, a stacked graph transformers 208 and a graph sequence decoder 212 learn to predict the masked entity tokens in the input situation graphs and action tokens by simulating implicit status transition processes between the entities. In an embodiment, all the output tokens of 210 may be input of the graph sequence decoder 212, where the graph sequence decoder 212 includes a pooling operation plus multiple-layers of MLPs. A hypergraph generator may build an output action hypergraph by connecting both predicted actions, existing and predicted missing entities. Missing entities can be invisible instances in a video.

Figure 3:
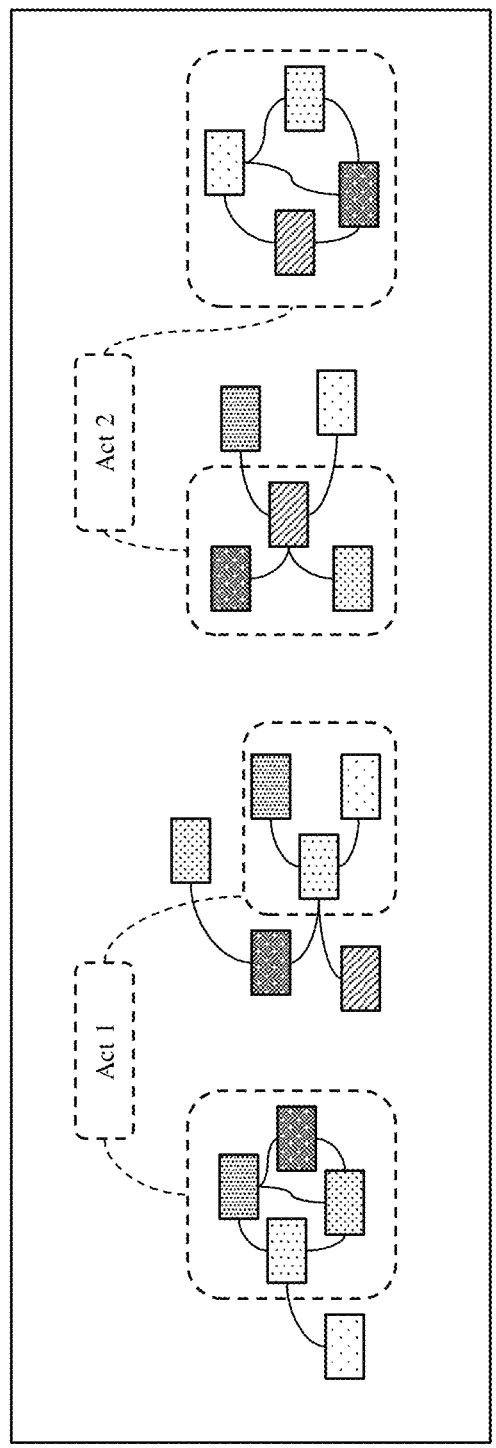
FIG. 3 shows example hypergraph or hypergraphs, which the transformers can build or learn in an embodiment

FIG. 3 shows an example hypergraph, which the transformers can build or learn in an embodiment, e.g., shown at 116 in FIG. 1. For example, given situations in real-world videos can be represented by hypergraphs connecting extracted atomic entities and relations (e.g., actions, persons, objects, and relationships). For instance, in an embodiment, a hypergraph can be learned to represent or describe dynamic processes in visuals, e.g., in real-world situations. Hypergraphs can represent actions and inner-relations and their hierarchical structures within situations, for example, within a video frame or segment. For instance, a video can include a set of subgraphs with person and object nodes, and edges which represent in-frame relations (person-object or object-object). Each action hyperedge can connect multiple subgraphs. In some embodiments, multiple actions can be overlapped, and the nodes in subgraphs can be shared. In an embodiment, the dynamic process in a video can be extracted as a set of consecutive and overlapped hypergraphs. Formally, the hypergraph H can be a pair H=(X,E), where X is a set of nodes for objects or persons that appear in video frames, and E is a set of non-empty hyperedge subgraphs Si for actions. In an embodiment, the hypergraph structure describes actions as hyperedges. Such structure can reflect a hierarchical abstraction from real-world situations and symbolic representations.

Referring back to FIG. 2, in an embodiment, the graph encoder 202 may transform a situation graph corresponding to a vide, an initial hypergraph with several subgraphs, into a structured token sequence (called a hypergraph token sequence). In an embodiment, to indicate the graph entities, hyper-edges, segments, and situations, the graph encoder 202 may sum the multiple types of embedding vectors for each token, e.g.: 1) token embedding: object appearances, human poses, relationship classes or predicate classes, 2) type or hyperedge embedding: indicates action predicates, persons, objects or relationships, 3) situation embedding: records situation frame time-order, 4) position embedding: object and person bounding boxes, and 5) segment embedding. Separation tokens can be used to mark the boundary of segments in token sequence. A token represents an entity node, an edge, or a hyperedge in a situated hypergraph. There can also be separation tokens. In an aspect, a situation corresponds to an entire given video; a segment corresponds to a video frame in the video. In an embodiment, by way of implementation example, the system may set parameters that may specify maximum number of situation graphs in a video, maximum number of actions and relationships in a single situation graph (e.g., subgraph). A hypergraph token sequence can be represented as a row-column data structure (e.g., a multi-dimensional vector) in an embodiment. Each situation column can be a structured situation sub-graph, and the associated situation subgraphs can share the same action and can be connected by action hyper-edges. Each row can represent a specific embedding token type. A situation column can have multiple columns, each of which can represent an embedding associated with a sub-graph (e.g., person, object, action, or relationship embedding). FIG. 4 shows an example structure of hypergraph token sequence for representations in an embodiment.

Referring back to FIG. 1, the language encoder 110 may parse each question or utterance to a functional program in the form of a program sentence. The functional program can be composed of a series of nested operations. For example, there can be different types of atomic operations (e.g., query function) defined to construct step-by-step reasoning programs. In an embodiment, a system may use an attention-based Seq2Seq model to parse the input questions into corresponding programs. In an embodiment, two models can be used to parse the questions and choices individually. In an embodiment, each model can include a bidirectional long-short term memory (LSTM) encoder plus an LSTM decoder. In an embodiment, by way of example, the system may use two hidden layers of 256 hidden units and an embedding layer to get 300-dimensional word vectors for both the encoder and decoder.

In an embodiment, the question-answering component (also referred to as a question answering head in the architecture in an embodiment) 112 can answer a given question 102b by running the functional program on a discrete graph, e.g., the generated hypergraph, which explicitly conducts the symbolic reasoning for the resulting answer. For example, in an embodiment, the question-answering component or head 112 plays the role of a reasoning engine. In an embodiment, the question-answering component or head 112 takes the program or output of the language encoder 110 and the predicted situation hypergraph 116 as symbolic and discrete inputs and runs the functional operations in the program on the hypergraph. In an embodiment, predefined operations can be implemented based on the entities and relations in structured situation hypergraphs. Each operation inputs certain entities or relationships and outputs the predictions as the inputs of the next reasoning step or the final answer prediction. In an embodiment, taking hypergraphs 116 as inputs, the reasoning starts from the cues (object, motion, or other basic data types) in questions as the initial query, then passes through all the operations iteratively and outputs the answer 114 finally. In an embodiment, the answer can be one that is selected from input candidate options (e.g., multiple choice). In another embodiment, the answer provided to an open-ended question (e.g., no candidate options or non-multiple choice).

Figure 5:
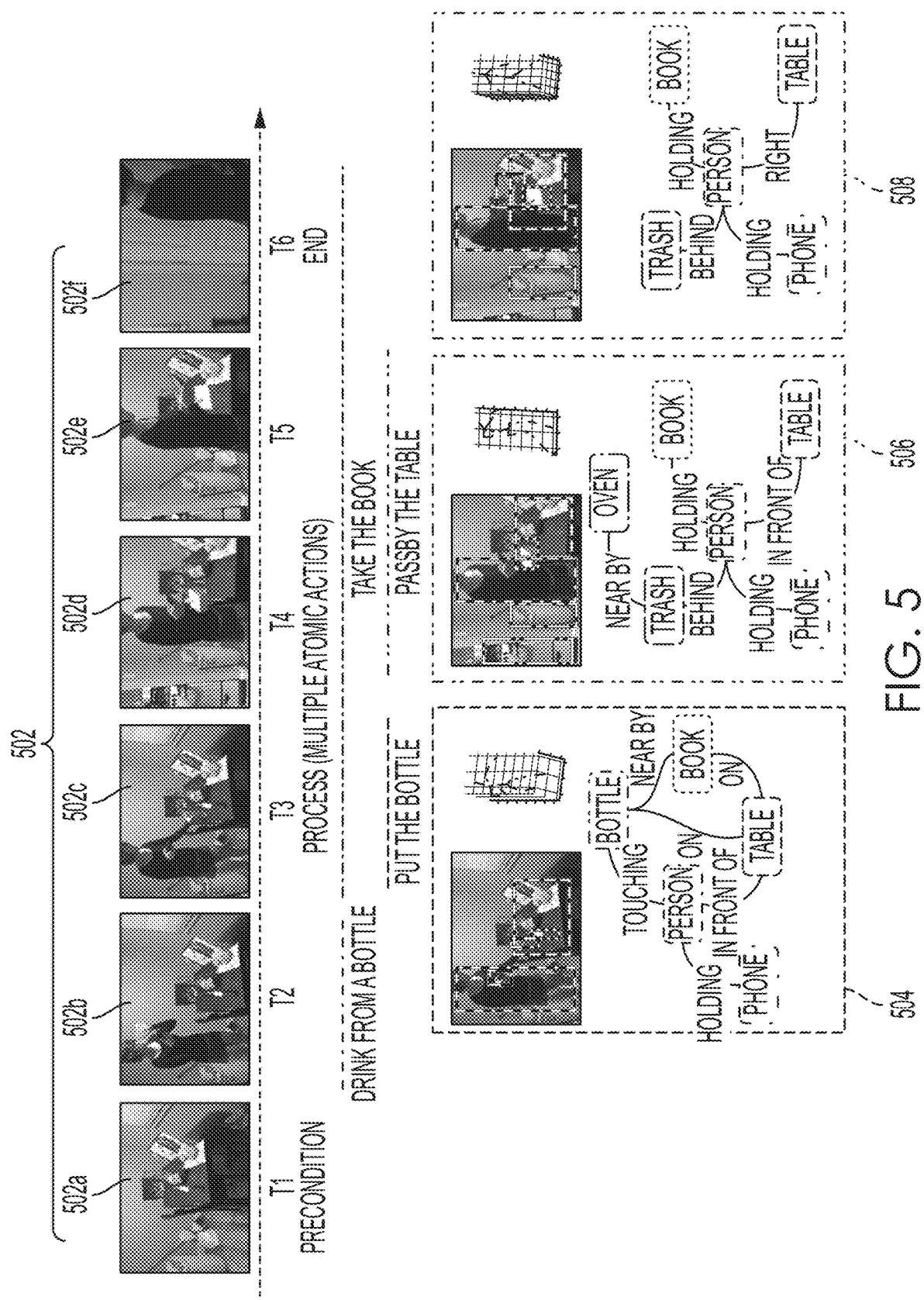
FIG. 5 is a diagram illustrating situation abstraction and graph initialization in an embodiment.

FIG. 5 is a diagram illustrating situation abstraction and graph initialization in an embodiment. A video 502 can have multiple frames 502a, 502b, 502c, 502d 502e, 502f. Situations in the video 502 can include precondition, process (atomic actions) and end. Situation decomposition can include extracting or decomposing entities (e.g., humans, objects, actions, relations) from the video frames. Relations can be: attention or contact (person-object relationships), temporal (action-action relationships) and spatial (person-object, object-object relationships). A graph can be built with nodes (e.g., representing objects, persons) and edges representing relationships, for example, associated with a video frame, e.g., as shown at 504, 506 and 508. For example, a situated video question answering can include providing a video showing activities of a person, e.g., in a sequence of video frames, and a question such as "how does the person take the book to the door"? An answer can be "put down the bottle, take the book and pass by the table." In an embodiment, candidate answer options such as "put down the bottle, take the book and pass by the table", "walk straight, take the book and put down the phone", "take the table, sit on the door and put down the can", "close the door, take the bottle, open the book" can also be given, from which the automated machine can select a correct answer.

In an embodiment, a machine such as a bot or robot can be trained to learn to reason actions, e.g., learn to act on certain events or based on a given situation, effectively understanding human actions in a real world setting. Examples of a machine, a bot or robot acting based on a given or current situation can include, but not limited to, grabbing items or objects, e.g., from a table, shelf or another, moving an object such as a box in a warehouse, and lifting objects. In an embodiment, a task may be given to a machine to evaluate or answer questions for action reasoning in a video representing a real world setting.

Figure 6:
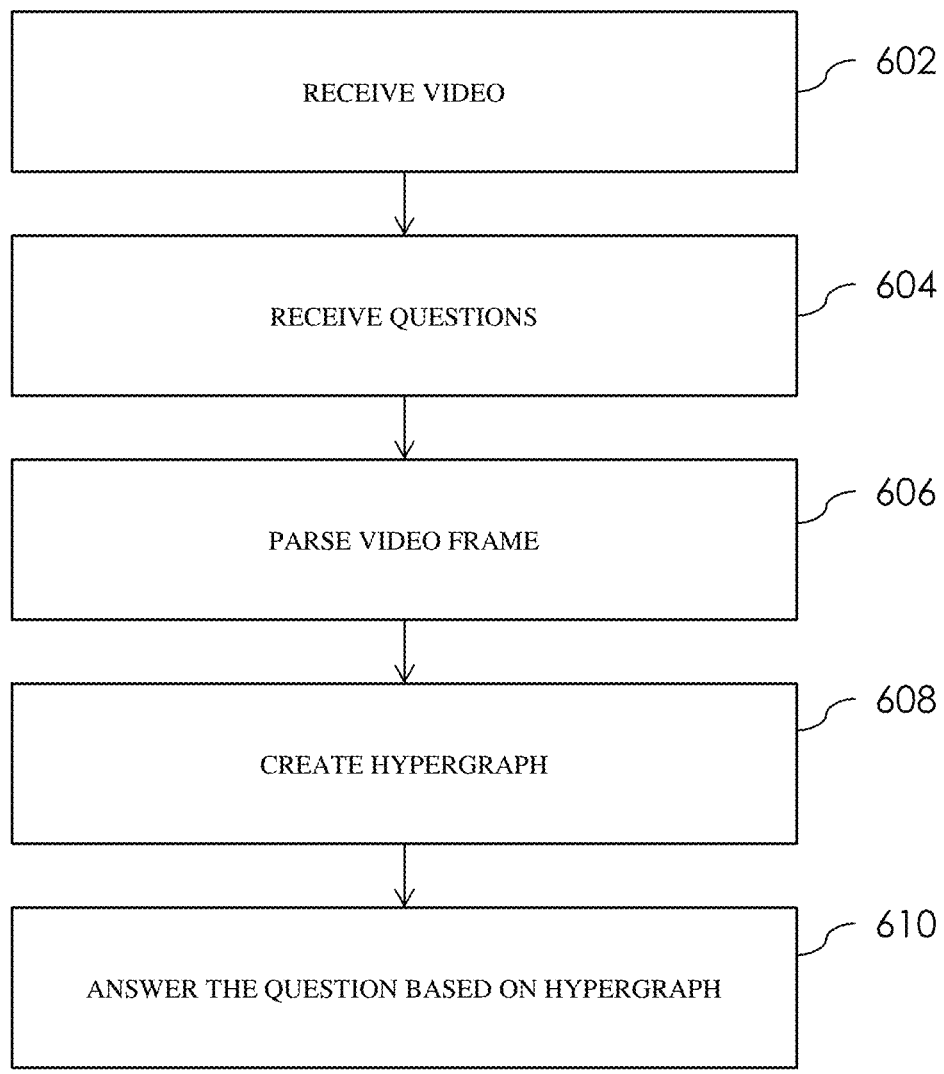
FIG. 6 is a flow diagram illustrating a method in an embodiment.

FIG. 6 is a flow diagram illustrating a method in an embodiment. The method can be implemented on or run by one or more computer processors and/or hardware processors. At 602, a video can be received. The video can include a plurality of video frames, for example, in sequence such as in time sequence. At 604, a question regarding the video can also be received. For example, a question regarding what is happening in the video and/or what may happen in the video, and/or another question about the video can be received. By way of example, types of questions can include, but not limited to: types of questions: interaction question, sequence question, prediction question, and feasibility questions. Each question can be associated with an action-centered situation from diverse scenes and places, and a situation can involve multiple actions.

At 606, a video frame in the video can be parsed into objects and relationships between the objects. In an embodiment objects can include persons and/or items appearing in the video frame. A subgraph of nodes and edges can be created. The nodes represent the objects parsed from the video frame and the edges represent the relationships between the objects appearing in the video frame. Such parsing and creating of a subgraph can be performed for each individual video frames in the video. In a video having multiple video frames, multiple corresponding subgraphs can be created.

At 608, a hypergraph is created, which includes the subgraphs representing the video frames in the video. The hypergraph also includes one or more edges or connections connecting at least some of the subgraphs. Such edges or connections can be created by learning relationships between the nodes of the subgraphs. An edge (also referred to as a hyper-edge) represents a relationship between at least one node of one subgraph and at least one node of another subgraph in the plurality of subgraphs. In an embodiment, the hypergraph provides a structured representation with entities and relations, of a present knowledge and dynamic changes in the video.

At 610, based on the hypergraph, an answer to the question about the video can be generated. In an aspect, an automated machine such as a bot or robot can be interacting or communicating with a user asking a question about the video, which may represent a current visual surrounding. For example, the machine may capture the present knowledge from dynamic situations as structured representation. The machine can answer such a question in interacting with the user.

In an embodiment, the hypergraph can be encoded as a visual embedding vector. In an embodiment, a neural network can learn to predict the relationships between the nodes of the subgraphs. In an embodiment, the question can be encoded as a language embedding vector. In an embodiment, a bi-directional long-short term memory (LSTM) encoder and decoder can parse the question. In an embodiment, the subgraphs are transformed into structured token sequences. Such token sequences can be converted into the visual embedding vector.

Figure 7:
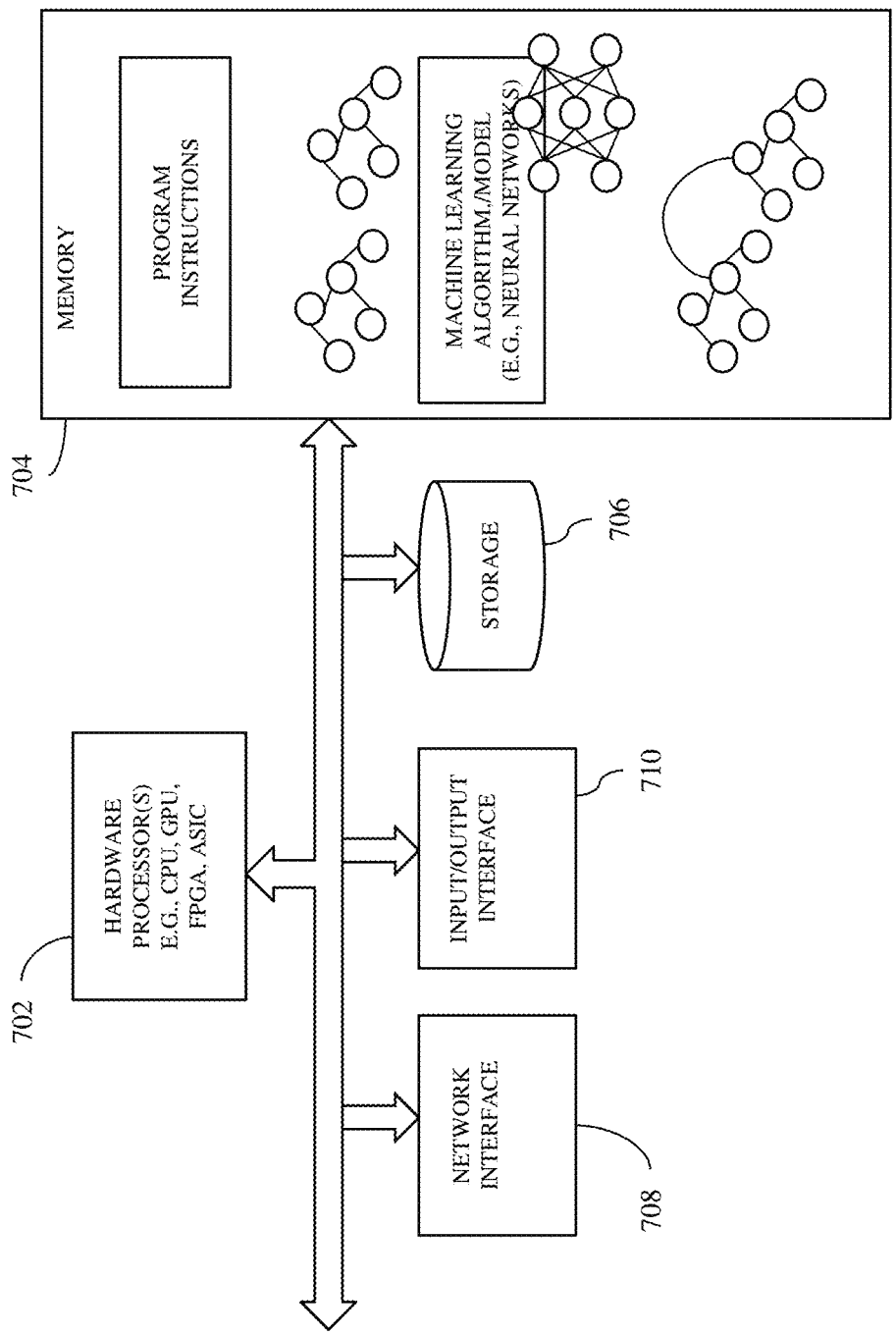
FIG. 7 is a diagram showing components of a system in one embodiment that can automate video question answering.

FIG. 7 is a diagram showing components of a system in one embodiment that can automate video question answering. One or more hardware processors 702 such as a central processing unit (CPU), a graphic process unit (GPU), and/or a Field Programmable Gate Array (FPGA), an application specific integrated circuit (ASIC), and/or another processor, may be coupled with a memory device 704, and generate a prediction model and recommend communication opportunities. A memory device 704 may include random access memory (RAM), read-only memory (ROM) or another memory device, and may store data and/or processor instructions for implementing various functionalities associated with the methods and/or systems described herein. One or more processors 702 may execute computer instructions stored in memory 704 or received from another computer device or medium. A memory device 704 may, for example, store instructions and/or data for functioning of one or more hardware processors 702, and may include an operating system and other program of instructions and/or data. One or more hardware processors 702 may receive input including a video and a question regarding the video. One or more hardware processors 702 may parse the video frame into at least objects and relationships between the objects and create a subgraph of nodes representing objects and the edges representing the relationships, where parsing and creating are performed for each video frame in the plurality of video frames, where a plurality of subgraphs is created, e.g., a subgraph corresponding to a video frame. One or more hardware processors 702 may create a hypergraph connecting at least some of the subgraphs by learning relationships between the nodes of the subgraphs, where a hyper-edge is created to represent a relationship between at least one node of one subgraph and at least one node of another subgraph in the plurality of subgraphs. One or more hardware processors 702 may generate an answer to the question based on the hypergraph. In one aspect, the video data and question data may be stored in a storage device 706 or received via a network interface 708 from a remote device, and may be temporarily loaded into a memory device 704 for building or generating a model that can predict relationships and create one or more hypergraphs. The learned model may be stored on a memory device 704, for example, for running by one or more hardware processors 702. One or more hardware processors 702 may be coupled with interface devices such as a network interface 708 for communicating with remote systems, for example, via a network, and an input/output interface 710 for communicating with input and/or output devices such as a keyboard, mouse, display, and/or others.

Figure 8:
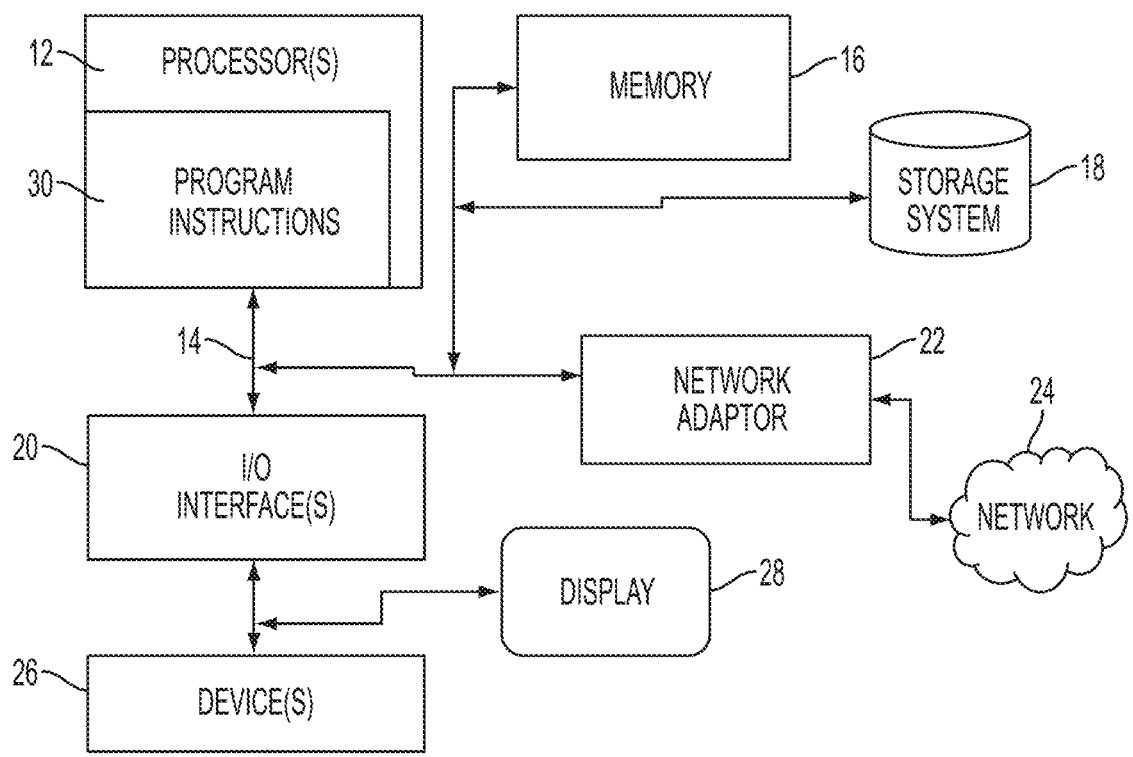
FIG. 8 illustrates a schematic of an example computer or processing system that may implement a system according to one embodiment.

FIG. 8 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 8 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being run by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
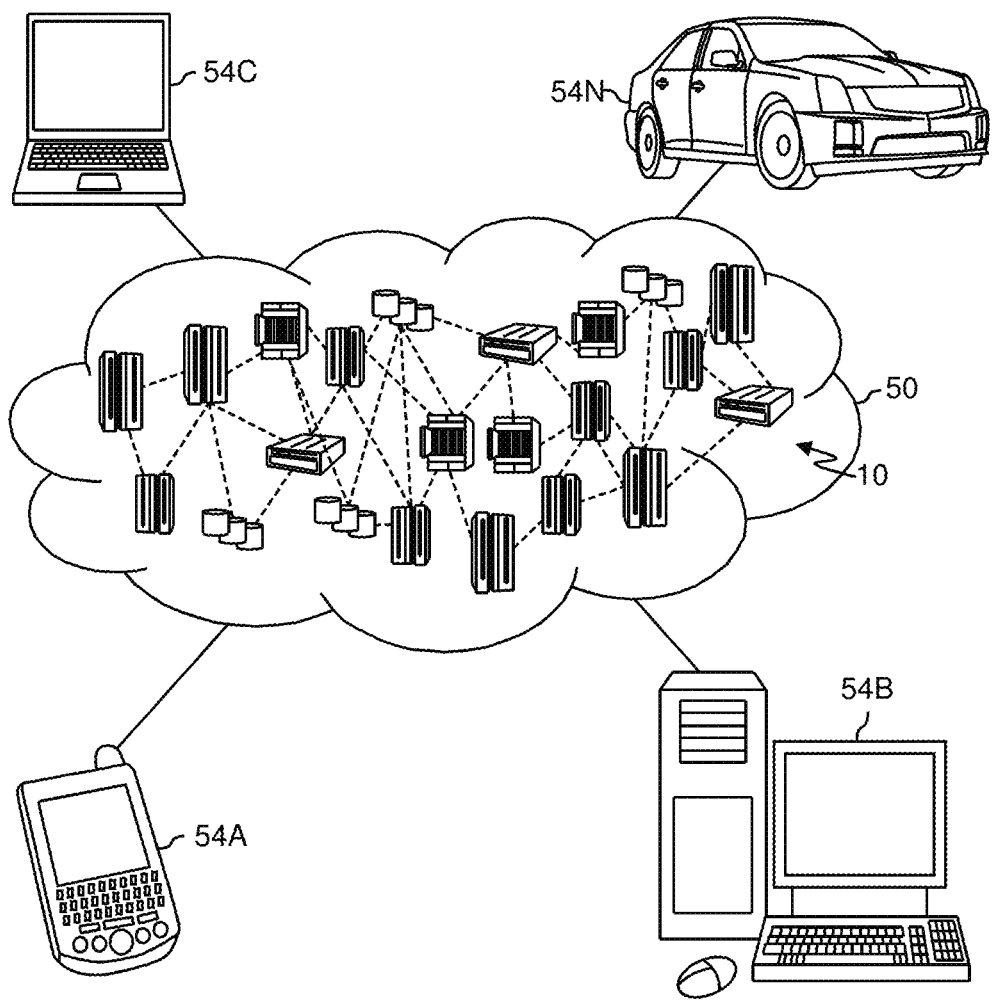
FIG. 9 illustrates a cloud computing environment in one embodiment.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
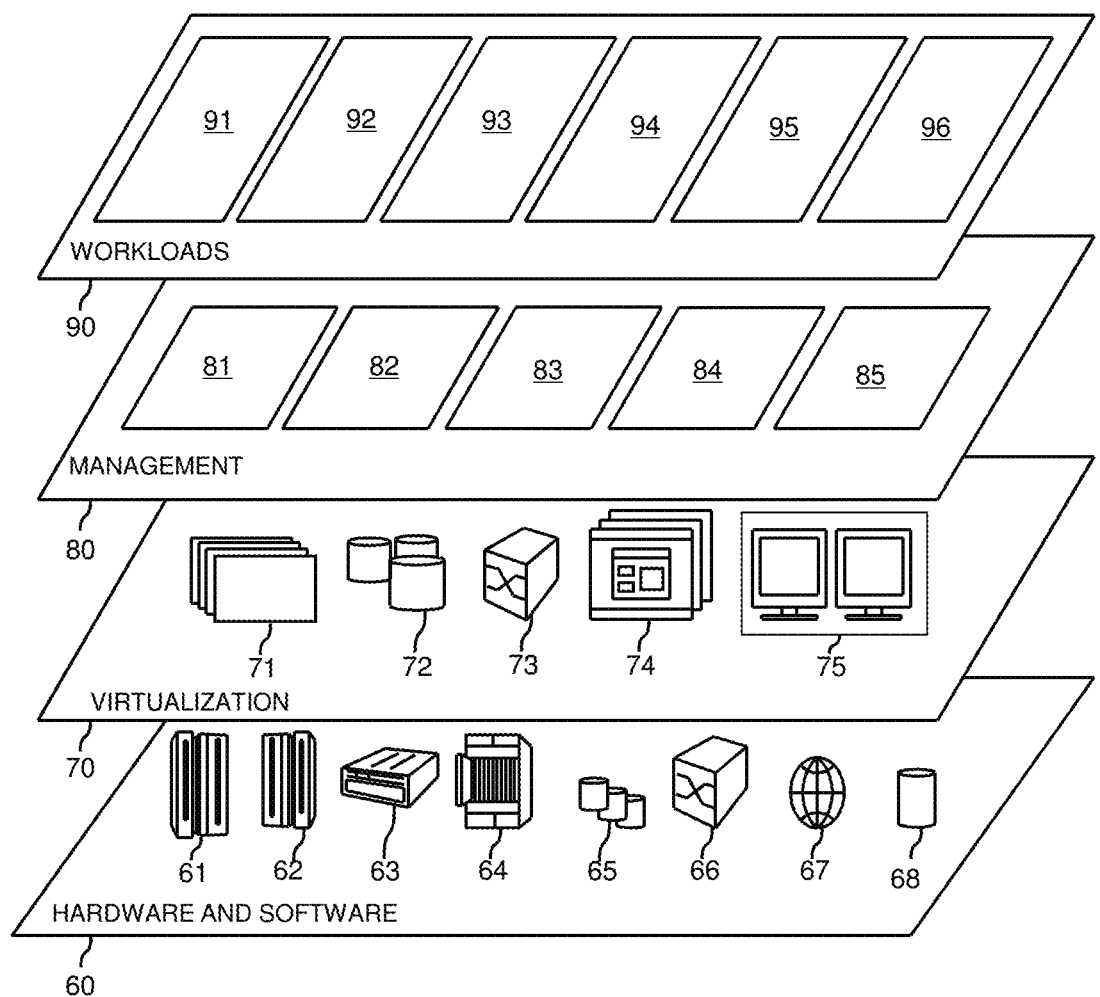
FIG. 10 illustrates a set of functional abstraction layers provided by cloud computing environment in one embodiment of the present disclosure.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and video question answering processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, run concurrently, substantially concurrently, in a partially or wholly temporally overlapping manner, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
    receiving a video including a plurality of video frames in sequence;
    receiving a question regarding the video;
    for a video frame in the plurality of video frames,
        parsing the video frame into at least objects and relationships between the objects; and
        creating a subgraph of nodes representing objects and edges representing the relationships,
        wherein the parsing and creating are performed for each video frame in the plurality of video frames, wherein a plurality of subgraphs is created;
    creating a hypergraph connecting at least some of the subgraphs by learning relationships between the nodes of the subgraphs, wherein a hyper-edge is created to represent a relationship between at least one node of one subgraph representing one video frame of the plurality of video frames and at least one node of another subgraph representing another video frame of the plurality of video frames, in the plurality of subgraphs, wherein a neural network with transformer architecture predicts future situations associated with the plurality of video frames in terms of the hypergraph; and
    generating an answer to the question based on the hypergraph.

2. The computer-implemented method of claim 1, wherein the hypergraph is encoded as a visual embedding vector.

3. The computer-implemented method of claim 1, wherein the question is encoded as a language embedding vector.

4. The computer-implemented method of claim 1, wherein a neural network learns to predict the relationships between the nodes of the subgraphs.

5. The computer-implemented method of claim 1, wherein a bi-directional long-short term memory (LSTM) encoder and decoder parse the question.

6. The computer-implemented method of claim 1, wherein the subgraphs are transformed into structured token sequences.

7. A system comprising:
    a processor; and
    a memory device coupled with the processor;
    the processor configured to at least:
        receive a video including a plurality of video frames in sequence;
        receive a question regarding the video;
        for a video frame in the plurality of video frames,
            parse the video frame into at least objects and relationships between the objects; and
            create a subgraph of nodes representing objects and edges representing the relationships,
            wherein parsing and creating are performed for each video frame in the plurality of video frames, wherein a plurality of subgraphs is created;
        create a hypergraph connecting at least some of the subgraphs by learning relationships between the nodes of the subgraphs, wherein a hyper-edge is created to represent a relationship between at least one node of one subgraph representing one video frame of the plurality of video frames and at least one node of another subgraph representing another video frame of the plurality of video frames, in the plurality of subgraphs, wherein a neural network with transformer architecture predicts future situations associated with the plurality of video frames in terms of the hypergraph; and
        generate an answer to the question based on the hypergraph.

8. The system of claim 7, wherein the hypergraph is encoded as a visual embedding vector.

9. The system of claim 7, wherein the question is encoded as a language embedding vector.

10. The system of claim 7, wherein a neural network learns to predict the relationships between the nodes of the subgraphs.

11. The system of claim 10, wherein the relationships include action relationships.

12. The system of claim 7, wherein a bi-directional long-short term memory (LSTM) encoder and decoder parse the question.

13. The system of claim 7, wherein the subgraphs are transformed into structured token sequences.

14. A computer program product comprising a computer readable storage medium having program instructions embodied therewith, the program instructions readable by a device to cause the device to:
receive a video including a plurality of video frames in sequence;
receive a question regarding the video;
for a video frame in the plurality of video frames,
parse the video frame into at least objects and relationships between the objects; and
create a subgraph of nodes representing objects and edges representing the relationships,
wherein parsing and creating are performed for each video frame in the plurality of video frames, wherein a plurality of subgraphs is created;
create a hypergraph connecting at least some of the subgraphs by learning relationships between the nodes of the subgraphs, wherein a hyper-edge is created to represent a relationship between at least one node of one subgraph representing one video frame of the plurality of video frames and at least one node of another subgraph representing another video frame of the plurality of video frames, in the plurality of subgraphs, wherein a neural network with transformer architecture predicts future situations associated with the plurality of video frames in terms of the hypergraph; and
generate an answer to the question based on the hypergraph.

15. The computer program product of claim 14, wherein the hypergraph is encoded as a visual embedding vector.

16. The computer program product of claim 14, wherein the question is encoded as a language embedding vector.

17. The computer program product of claim 14, wherein a neural network learns to predict the relationships between the nodes of the subgraphs.

18. The computer program product of claim 17, wherein the relationships include action relationships.

19. The computer program product of claim 14, wherein a bi-directional long-short term memory (LSTM) encoder and decoder parse the question.

20. The computer program product of claim 14, wherein the subgraphs are transformed into structured token sequences.

* * * * *